(12) United States Patent
Craft et al.

(10) Patent No.: US 8,601,147 B2
(45) Date of Patent: Dec. 3, 2013

(54) EXPORT OF METADATA STREAMS TO APPLICATIONS

(75) Inventors: David Jones Craft, Wimberly, TX (US); Lance Warren Russell, Rosanky, TX (US)

(73) Assignee: International Business Machines Corporation, Armonk, NY (US)

(*) Notice: Subject to any disclaimer, the term of this patent is extended or adjusted under 35 U.S.C. 154(b) by 918 days.

(21) Appl. No.: 12/057,708

(22) Filed: Mar. 28, 2008

(65) Prior Publication Data

US 2009/0248887 A1  Oct. 1, 2009

(51) Int. Cl.
*G06F 15/16* (2006.01)

(52) U.S. Cl.
USPC .......................................... 709/231; 709/234

(58) Field of Classification Search
USPC ........................................................ 709/231
See application file for complete search history.

(56) References Cited

U.S. PATENT DOCUMENTS

| | | | |
|---|---|---|---|
| 5,522,039 A | 5/1996 | Snyder et al. | |
| 6,061,731 A * | 5/2000 | Blakeslee | 709/231 |
| 6,130,986 A | 10/2000 | Noritomi | |
| 6,530,061 B1 | 3/2003 | Labatte | |
| 6,976,205 B1 | 12/2005 | Ziai et al. | |
| 7,155,539 B2 * | 12/2006 | Vange et al. | 709/250 |
| 7,716,359 B2 * | 5/2010 | Kukoleca et al. | 709/231 |
| 2002/0107962 A1 * | 8/2002 | Richter et al. | 709/225 |
| 2002/0107971 A1 * | 8/2002 | Bailey et al. | 709/231 |
| 2007/0088957 A1 * | 4/2007 | Carson | 713/176 |
| 2008/0016436 A1 * | 1/2008 | Liu et al. | 715/212 |
| 2009/0248887 A1 * | 10/2009 | Craft et al. | 709/231 |

* cited by examiner

*Primary Examiner* — Firmin Backer
*Assistant Examiner* — Keyvan Emdadi
(74) *Attorney, Agent, or Firm* — David Mims; Robert C. Rolnik

(57) ABSTRACT

The present invention provides a computer storage server implemented method for generating attribute streams. The storage server receives a request from an application to write data to at least one storage object, the request having a request type. The storage server then updates an attribute stream with metadata associated with the at least one storage object. The storage server also updates the attribute stream with the at least one checksum, such that the attribute stream is associated with the at least one storage object. The storage server determines the request type to be one selected from among the group consisting of an email type, a file transfer protocol type, and a hypertext transfer protocol type. Responsive to a determination that the request type is among one selected from the group consisting of an email type, a file transfer protocol type, and a hypertext transfer protocol type, the storage server verifies the application. Based on the determination of the request type, the storage server then updates the attribute stream by applying a filter among one selected from the group consisting of an email attribute stream filter, file transfer protocol attribute stream filter and a hypertext transfer protocol attribute stream filter.

11 Claims, 5 Drawing Sheets

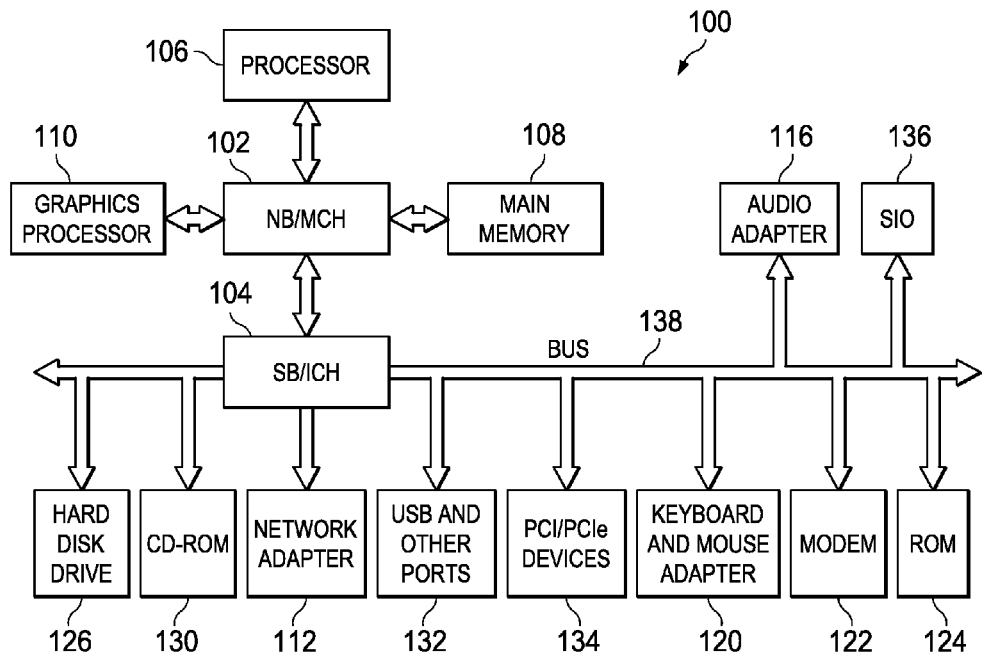
FIG. 1
```
                    301      303       305                                  300
        <checksum>    \        \         /
310 {   <block><from>0</from><to>4095</to><value>0xF8332345</value></block>
        <block><from>4096</from><to >8191</to><value>0xF8237890</value></block>
        </checksum>
```
FIG. 3A
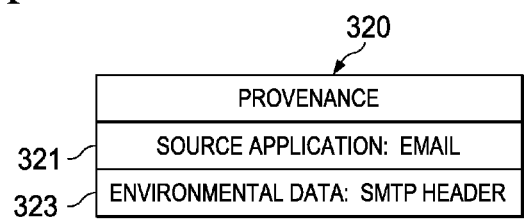
FIG. 3B
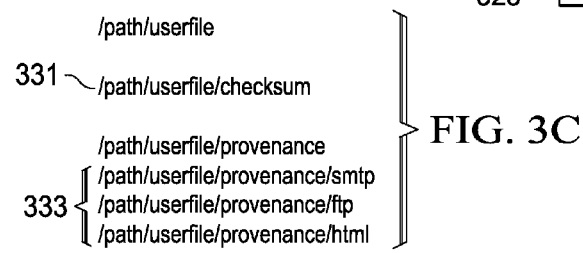
FIG. 3C

EXPORT OF METADATA STREAMS TO APPLICATIONS

BACKGROUND OF THE INVENTION

1. Field of the Invention

The present invention relates generally to a computer implemented method, data processing system, and computer program product for providing file system support to applications. More specifically, the present invention relates to collecting metadata.

2. Description of the Related Art

Modern uses of networked computers leverage storage capacity by sharing groups of storage devices together to better use available capacity of the collection of storage devices. Technologies such as storage area network (SAN) and network attached storage (NAS), for example, have driven demand for collectivizing storage devices into pools accessed over the network. Organized and managed by a small number of storage servers, many storage devices respond to requests made by applications that often reside on separate processors or hosts.

Application level programs such as database programs can rely heavily on pools of storage devices to provide storage as a service. Although this arrangement can allow an organization to achieve greater focus on tuning and maintaining the application, the arrangement can create impediments to efficiently eliminating waste caused by duplicating storage objects in the pool of storage devices. In addition, application level programs can be challenged to identify changed portions of a repository that may require backing up from time to time.

These challenges develop from a lack of data at the application level to identify, in an efficient manner, storage objects that are unique, and storage objects that are identical. Prior art has shown that metadata can be accessed by way of using a stat command in the AIX® operating system, among others. AIX is a trademark of the IBM Corporation in the United States, other countries, or both. A stream is a sequence of data of undetermined length. An attribute stream is a sequence of metadata or data about data.

SUMMARY OF THE INVENTION

The present invention provides a computer implemented method and computer program product for generating attribute streams. The storage server receives a request from an application to write data to at least one storage object, the request having a request type. The storage server then updates an attribute stream with metadata associated with the at least one storage object. By updating an attribute stream with the at least one checksum, the storage server can associate the attribute stream with the at least one storage object. The storage server determines the request type to be one selected from among the group consisting of an email type, a file transfer protocol type, and a hypertext transfer protocol type, among others. Responsive to a determination that the request type is among one selected from the group consisting of an email type, a file transfer protocol type, and a hypertext transfer protocol type, the storage server verifies the application. Based on the determination of the request type, the storage server then updates an attribute stream among one selected from the group consisting of an email attribute stream, file transfer protocol attribute stream and a hypertext transfer protocol attribute stream.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a block diagram of a data processing system in accordance with an illustrative embodiment of the invention;

FIG. 3A is an example of an attribute stream in accordance with an illustrative embodiment of the invention;

FIG. 3B is an alternative form of storing an attribute stream in accordance with an illustrative embodiment of the invention;

FIG. 3C shows examples of handles to attribute streams and an associated file in accordance with an illustrative embodiment of the invention;

DETAILED DESCRIPTION OF THE PREFERRED EMBODIMENT

Figure 2:
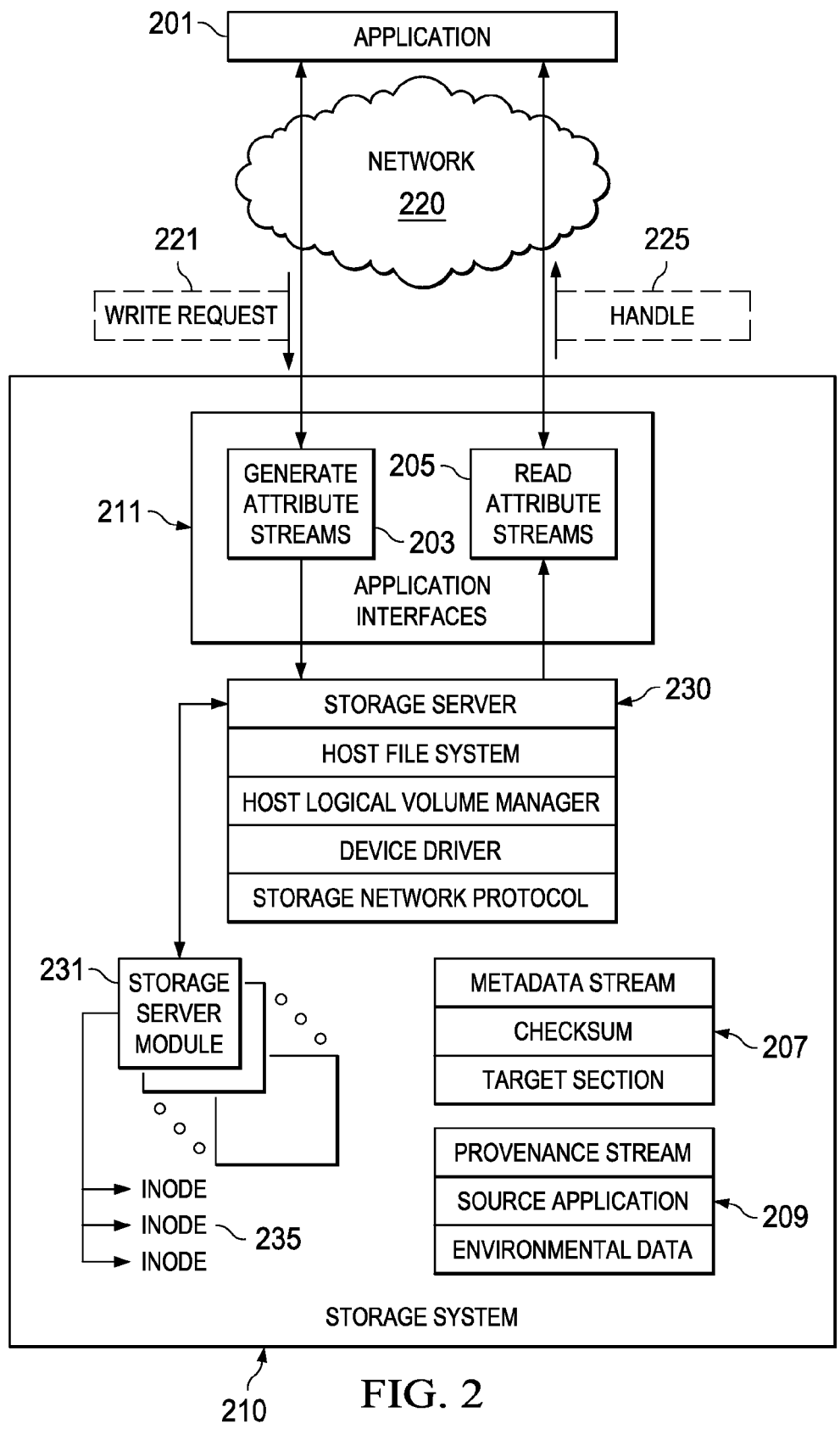
FIG. 2 shows a an application residing on a host interacting with a storage server in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable storage device(s) may be utilized. The computer-usable or computer-readable storage device may be, for example but not limited to, an electronic, magnetic, optical, electromagnetic, infrared, or semiconductor system, apparatus or device. More specific examples (a non-exhaustive list) of the computer-readable storage device would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, a magnetic storage device. Note that the computer-usable or computer-readable storage device could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable storage device medium may be any medium that can contain or store, the program for use by or in connection with the instruction execution system, apparatus, or device. The computer usable program code may be transmitted using any appropriate medium, including but not limited to wireless, wireline, optical fiber cable, RF, etc. The term "computer-readable storage device" does not encompass a signal propagation media such as a copper cable, optical fiber or wireless transmission media.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for allowing retrieval of checksum and other metadata on all storage objects in use by a storage system. Such access to checksum may permit an application to detect duplicate storage objects. In addition, applications relying upon such embodiments may be able to respond more efficiently to changed storage objects to perform, for example, backup, restore, and archival functions. Accordingly, an embodiment of the invention provides new attribute streams that allows users to read and manipulate new metadata.

FIG. 2 shows an application residing on a host interacting with a storage server in accordance with an illustrative embodiment of the invention. Application 201 relies upon storage system 210 to support the functions of the application. Application 201 communicates over network 220 to access storage objects hosted under the control of storage server 230. A storage object is a data structure on storage media that describes an aspect of a file system. A storage object can be, for example, a file, an inode, a directory, a partition on a hard drive, among other storage objects. The storage server may rely upon software components such as a host file system, host logical volume manager, device drivers to communicate with application 201, and to manage and maintain data among storage server modules. Storage server module 231 connects to storage server 230 either within a common data processing system, or in an external data processing system reachable over a network.

Storage server module 231 may be one of many storage server modules. The storage server modules may be multiple instances of data processing system 100 of FIG. 1, for example. Each storage server module can host one or more file systems, or be arranged to present a portion of a file system, as may be implemented in a network file system (NFS). Data may be physically organized using a system of inodes to permit efficient data retrieval, storage, with due attention to error detection and recovery. Storage system 210 is the combination of the storage server with one or more storage server modules.

Attendant with the normal operation of these storage systems is the creation of metadata. Metadata is data about data. For example, the metadata can include a data about when a file was last modified, a set of permissions associated with a file, or a number of inodes that collectively store the file (or storage object). Metadata can include data that forms a checksum for data stored within an inode. A checksum is a value calculated based on a block of data. The checksum can be transmitted or stored along with the data in order to detect corruption of the data. A checksum is calculated on the formation or updating of the storage object, and can operate as a hash to distinguish one storage object from another, or detect, in short order, an identity between two storage objects.

The storage server responds to a request from application 201 by selecting an appropriate application interface from among the application interfaces 211 of storage system 210. Write request 221 is an application interface invocation. The request can be a write request, a read request, or a metadata request, among others. A write request commands the storage system to write a storage object. A read request commands the storage system to read a storage object. Accordingly, the request can invoke generate attribute streams 203, or read attribute streams 205, respectively.

Storage server 230 may receive a command to copy a file. In this example, the storage server identifies storage server module 231 from among several that stores the storage object. Storage server module 231 is called to perform the actual transformation of the data. In this case, one or more blocks of data are copied. Thus, storage server module may copy the contents of one or more inodes to a second set of inodes. Inode 235 may be one of the inodes to be copied.

During the ordinary course of modifying data, storage server module creates metadata. Generate attribute streams 203 assembles such metadata into an attribute stream, for example, metadata stream 207. Alternatively, generate attribute streams 203 can respond to a request of a type 'provenance', by generating provenance stream 209. A provenance stream is an attribute stream made up of provenance data. Provenance data is metadata that is used to describe a context under which the associated data was written. The context can include which application is a source or modifier of the associated data. Other contexts can include the program environment, and, if known, the subtype concerning any known type of the data. A subtype is information concerning the structure of the data. For example, an email may include Simple Mail Transport Protocol (SMTP) headers. Accordingly, the email has metadata of a subtype concerning headers, such as SMTP. A subtype is a form of context.

Alternatively, application 201, can request reading data from an attribute stream. Read attribute streams 205 locates the applicable data stream. Read attribute streams 205 may respond by returning handle 225 to the applicable attribute stream to application 201. Alternatively, read attribute streams 205 may provide an empty stream in cases where no metadata exists for a requested context or context subtype.

FIG. 3A is an example of an attribute stream in accordance with an illustrative embodiment of the invention. Attribute stream 300 may be formed according to extensible markup language (XML) format. XML is a markup language. XML format is defined by World Wide Web Consortium XML 1.1, and other XML standards. A unit of data within attribute stream 300 may be enclosed by tags, for example, "<block>" and "</block>", opening and closing tags, respectively. Attribute stream 300 contains a metadata stream for two blocks of data stored on media of a storage system, for example storage system 210 of FIG. 2. A beginning physical location 301, marked by "0", and end physical location 303, marked by "4095", of block 310 can be paired with checksum 305, marked by "0xF8332345", in this manner.

FIG. 3B is an alternative form of storing an attribute stream in accordance with an illustrative embodiment of the invention. Provenance stream 320 contains fields for source application 321, and for environmental data 323. In this case, source application 321 hold the contents "email", and environmental data 323 holds "SMTP header". The attribute stream may use fixed width fields, or establish fields based on field delimiters.

FIG. 3C shows examples of handles to attribute streams and an associated file in accordance with an illustrative embodiment of the invention. The associated file may use a hierarchical file naming convention. Under such a convention, directories and file names may be separated by a delimiter, such as, for example, a "/" character. The file, which is an example of a storage object, may have a related metadata stream name 331 and provenance stream names 333. Application interfaces, as described below, may provide a handle consisting of a name to a requesting application. A name is a string associated with an attribute stream. Such a string can be based on the storage object as well as the type of request. In this case, provenance stream names 333 include a provenance stream for "SMTP" (Simple Mail Transport Protocol); a provenance stream for "FTP" (File Transfer Protocol); and a provenance stream for "html" (hyper text markup language).

Figure 4:
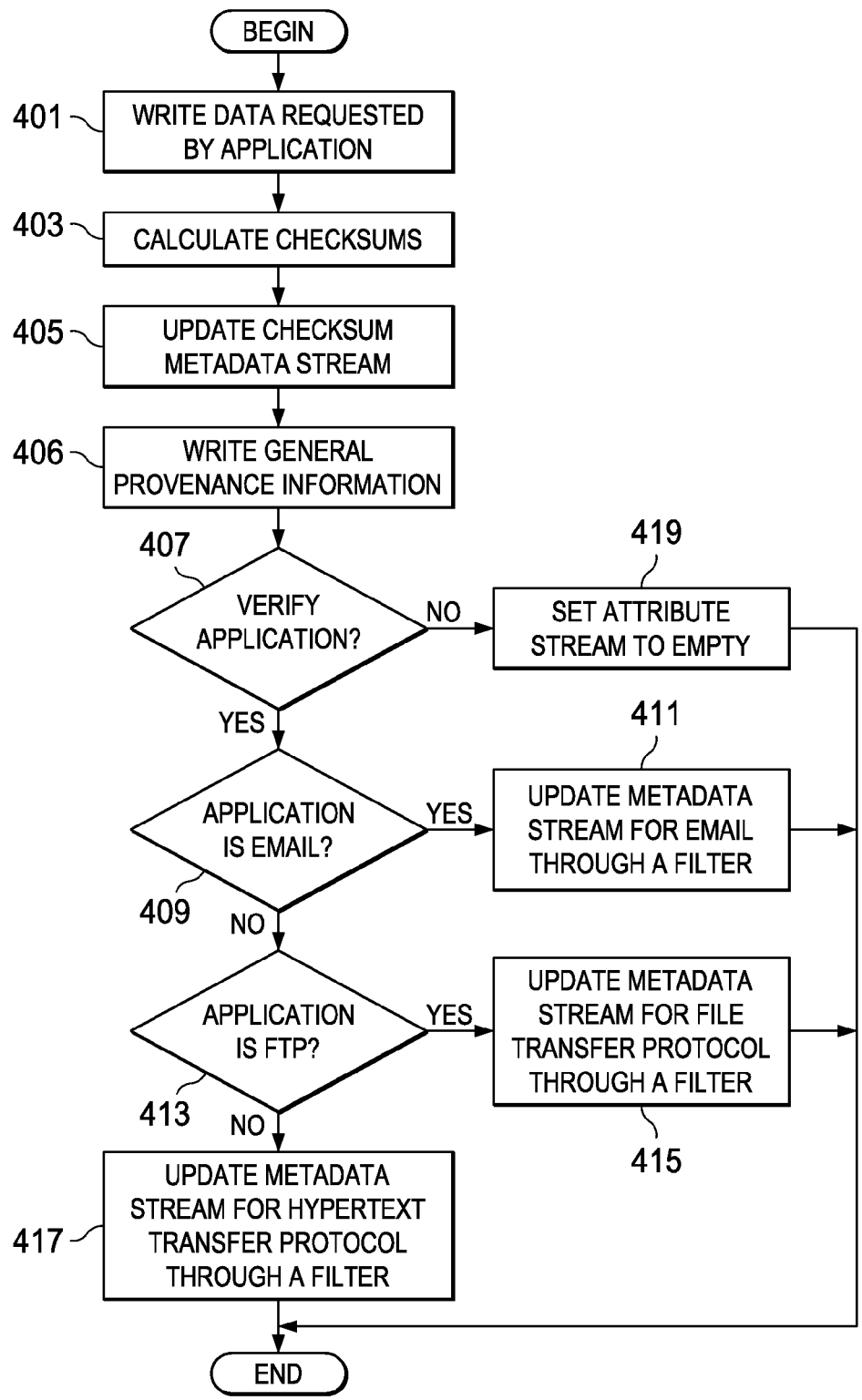
FIG. 4 is a flowchart of steps that an application interface uses to form or update an attribute stream in accordance with an illustrative embodiment of the invention.

FIG. 4 is a flowchart of steps that an application interface uses to form or update an attribute stream in accordance with an illustrative embodiment of the invention. Initially, a storage server receives a request from an application to write data to at least one storage object (step 401). The storage server can be, for example, storage server 230 of FIG. 2, above. Next, the storage server calculates checksums applicable to the data request (step 403). Next, the storage server updates the checksum metadata stream (step 405). Attendant with step 405, the storage server may provide location information for the block associated with the checksum in a manner as depicted in FIG. 3A, above. Next, the storage server writes the general provenance information (step 406). Next, the storage server verifies that the application is associated with the request type (step 407). If the request type is not correctly matched to the application or subtype, that is, a negative result to step 407, the storage server sets the attribute streams for known applications associated to empty (step 419). Next, the storage server terminates processing. A request type is a parameter that is included in a program call or other request made by an application.

On the other hand, if the application is verified at step 407, the storage server may determine if there is a further subtype. A further subtype can be, for example, SMTP, or other protocols that define email headers. Determining further subtypes may include the storage server determining if the application is email (step 409). If the application is email, the storage server updates a metadata stream through a filter for email (step 411). This step may also be called passing the data through the email filter. The filter may be selected from one among the group consisting of an email attribute stream filter, file transfer protocol attribute stream filter and a hypertext transfer protocol attribute stream filter. A filter is a software component that may integrate metadata together with XML. When a filter integrates metadata together with XML, the filter associates each item of metadata with a tag and also with other metadata within the XML framework. For example, the filter creates the metadata when writing a file such as /path/userfile/checksum. A filter that responds to a statx 'C' interface may convert the metadata into the format defined by the statx interface. A filter may produce a stream.

A negative result to step 409 may cause the storage server to determine if the application is a file transfer protocol (FTP) application (step 413). A positive determination to step 413 causes the storage system to update the metadata stream through a filter for a file transfer protocol (step 415). However, if the result to step 413 is negative, the storage system may update metadata stream through a filter for hypertext transfer protocol (step 417). Processing terminates after steps 411, 415, and 417.

Metadata streams may be updated or otherwise created based on an application interface invoking commands such as "stat", "find", and "ls", as available in a number of operating systems. The operating system may be, for example, AIX®, among others. These commands may read the applicable metadata so that the application interface may direct the streams into files or other data structures. A filter may be a software component that assembles raw data output from commands described above. Accordingly, the filter may assemble XML tags and other constructs around the associated metadata. The operating system may rely upon data processing system 100 of FIG. 1, for example to perform the steps of the filters.

Figure 5:
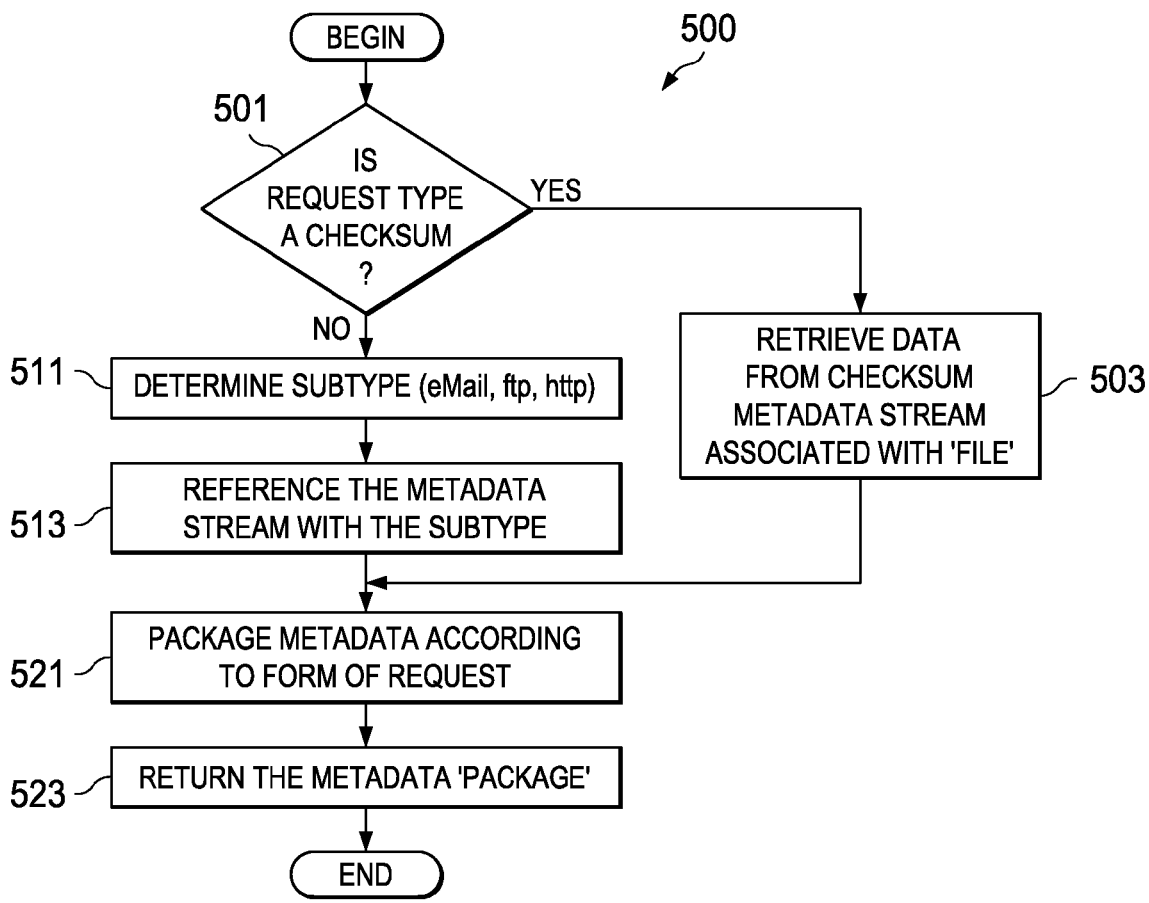
FIG. 5 shows a flowchart to provide metadata to an application in accordance with an illustrative embodiment of the invention.

FIG. 5 shows a flowchart to provide metadata to an application in accordance with an illustrative embodiment of the invention. Flowchart 500 shows steps for providing metadata concerning retrieval of and packaging of metadata concerning email, FTP and HTTP data. Steps of flowchart 500 may be performed by read attribute streams 205 of storage system 210 of FIG. 2. The steps of flowchart 500 are collectively known as exporting. Accordingly, an application may access metadata.

Initially, the storage system receives a request type. The request type is associated with a storage object. Accordingly, the storage system determines whether the request type is a checksum request type (step 501). If so, the storage system retrieves data from a checksum metadata stream associated with a file (step 503). The checksum metadata received in this manner is also known as an exported checksum. The file may be an identifier passed to read metadata streams application interface. Next, the storage system may package the metadata (step 521). Packaging the metadata may involve packaging an attribute stream based on the request type. The packaging may be performed based on the form of the request (command line, XML, 'C' interface, etc.). Next, the storage system returns an attribute stream to the requesting application (step 523). The attribute stream may be returned as a path or as a handle. The storage system returns the attribute stream to the requesting application. Processing terminates thereafter.

If, however, the request type is not a checksum, the outcome to step 501 is negative. Next, the storage system determines a provenance type or subtype to be among an email type; an FTP type; or an HTTP type (step 511). Accordingly, the storage system references the metadata stream associated with the subtype (step 513). For example, if the provenance subtype is an email type, the storage system may retrieve a "to" field, a cc field, and a bcc field, among others. The handle can be based on the name of the storage object. For example, the handle can be the name of the storage object, with additional characters concatenated. See, for example, metadata stream name 331 of FIG. 3C.

In response to referencing the metadata stream, the storage system may package the metadata at step 521 and continue by performing step 523. Processing terminates thereafter.

An example of the operation of FIG. 5 may illustrate the features of one or more embodiments of the invention. In this example, a user is performing a search application. The search application may operate as application 201 in FIG. 2. The search application includes a read request for provenance data of a type email for metadata of concerning "subject:", a field found in SMTP headers. Step 501 determines that the request type is not a checksum. Next, step 511 determines that the provenance subtype is SMTP. Next, step 513 references the metadata stream with the provenance subtype. The subtype can be referenced, for example, using /path/userfile/ provenance/smtp. Next, step 521 may return a handle associated with the data. In addition, the handle may be associated with a stream that contains information within the "subject:" field. In the SMTP case, such information can include a string of characters up to an end-of-line or up to any applicable subject line limitation set by SMTP standards.

Figure 6A:
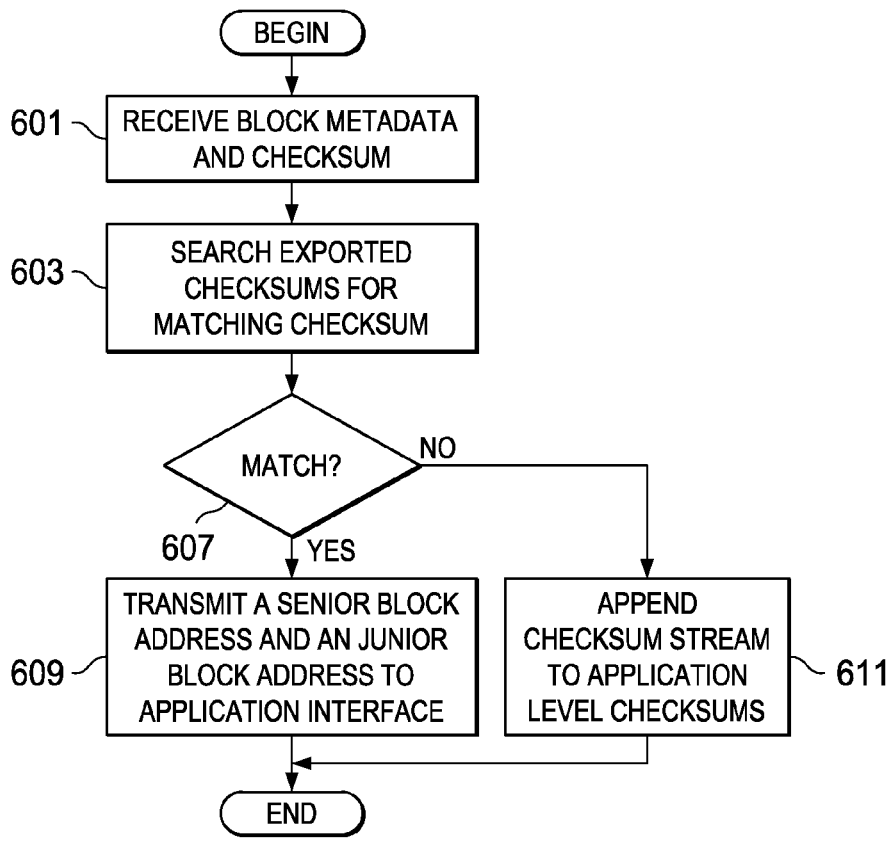
FIG. 6A is a flowchart of application steps in accordance with an illustrative embodiment of the invention.

FIG. 6A is a flowchart of application steps in accordance with an illustrative embodiment of the invention. An application may provide feedback to an application interface to signal the presence of redundant blocks within storage system. The application may be application 201, and the application interface may be application interfaces 211, shown in FIG. 2.

An application may receive block metadata and associated checksum (step 601). The application may receive block metadata and an associated checksum in the manner described above in connection with step 503 of FIG. 5. Next, the application searches exported checksums for a matching checksum (step 603). The application determines whether there is a match between a junior checksum and a senior checksum (step 607). A senior checksum is a checksum received by an application at a time earlier than a junior checksum. Accordingly, the junior checksum is a checksum received by an application later in time than a senior checksum.

If the application determines a match, the application transmits the senior block address and the junior block address to the application interface (step 609). A senior block address is the physical or other address of a block. A junior block address is the physical or other address of a block where the block is the newer among the junior block and the senior block. If the checksums do not match in step 607, then the application appends the checksum stream received in step 601 to checksums previously exported to the application (step 611). Processing terminates thereafter.

Figure 6B:
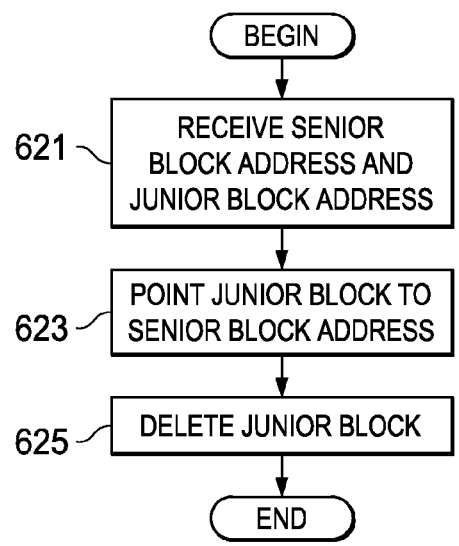
FIG. 6B is a flowchart of application interface steps in accordance with an illustrative embodiment of the invention.

FIG. 6B is a flowchart of application interface steps in accordance with an illustrative embodiment of the invention. Initially, the application interface receives a senior block address and a junior block address (step 621). The senior block and the junior block may be presented in a manner similar to that of FIG. 3A. Next, the application interface points the junior block to the senior block (step 623). Lastly, the application interface may delete the junior block (step 625). Processing terminates thereafter.

The illustrative embodiments permit a user to obtain attribute streams in a storage server in a data processing environment. A storage server can provide checksums on all storage objects, so that the application can use the checksums to detect duplicates. In addition, the application can use the addressability information to allow reading storage data associated with the checksum. The embodiments of the invention can create a new attribute stream that allows users to read and manipulate new metadata by directing an operation to the correct stream. Accordingly, one or more embodiments may include an application interface used to collect metadata generated with invocation of operating system commands and place such metadata into data structures in a file storage system. The applications that rely on the application interface may make use of checksums without recalculating such checksums outside of the storage system. Lastly, the availability of checksums and other metadata can simplify de-duplication and auditing functions performed by the application.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the embodiment may transmit and receive data from an application that is accessed through a network, or may be accessed on a local server of a storage system.

Furthermore, the invention can take the form of a computer program product accessible from a computer-usable or computer-readable storage device providing program code for use by or in connection with a computer or any instruction execution system. For the purposes of this description, a computer-usable or computer readable storage device can be any tangible apparatus that can contain or store, the program for use by or in connection with the instruction execution system, apparatus, or device.

The computer-readable storage device can be an electronic, magnetic, optical, electromagnetic, infrared, or semiconductor system (or apparatus or device). Examples of a computer-readable storage device medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A storage server implemented method for generating attribute streams, the method comprising:
   receiving a request from an application to write data to at least one storage object, the request having a request type, wherein the at least one storage object is a data structure on storage media that describes an aspect of a file system;
   updating an attribute stream with metadata associated with the at least one storage object, wherein the attribute stream is a sequence of metadata or data about data;
   updating an attribute stream with an at least one checksum, the attribute stream associated with the at least one storage object;
   the storage server verifying that the application is associated with the request type;
   responsive to verifying that the application is associated with the request type, determining the request type to be among one selected from the group consisting of an email type, a file transfer protocol type, and a hypertext transfer protocol type; and
   updating the attribute stream by applying a filter among one selected from the group consisting of an email attribute stream filter, file transfer protocol attribute stream filter and a hypertext transfer protocol attribute stream filter, based on the determination of the request type, responsive to verifying, by the storage server, the application.

2. The storage server implemented method of claim 1, wherein updating the attribute stream comprises updating the attribute stream to conform to extensible markup language format.

3. The storage server implemented method of claim 1, wherein updating the attribute stream further comprising:
   calculating the at least one checksum associated with the at least one storage object; and
   updating the attribute stream with the at least one checksum, wherein the attribute stream is associated with the at least one storage object.

4. The storage server implemented method of claim 3, further comprising:
   receiving a senior block address having the at least one checksum;
   receiving a junior block address having the at least one checksum;
   pointing the junior block address to the senior block address; and
   deleting a block associated with the junior block address.

5. The storage server implemented method of claim 1, wherein updating the attribute stream further comprises:
   obtaining provenance data; and
   updating the attribute stream with the provenance data.

6. A computer program product for generating attribute streams, the computer program product comprising:
   a computer usable tangible storage device having computer usable program code stored on the computer usable tangible storage device, the computer program product comprising:
   computer usable program code configured to receive a request from an application to write data to at least one storage object, the request having a request type, wherein the at least one storage object is a data structure on storage media that describes an aspect of a file system;
   computer usable program code configured to update the attribute stream with metadata associated with the at least one storage object;
   computer usable program code configured to update an attribute stream with the at least one checksum, the attribute stream associated with the at least one storage object;
   computer usable program code configured to verify that the application is associated with the request type;
   computer usable program code configured to determine the request type to be among one selected from the group consisting of an email type, a file transfer protocol type, and a hypertext transfer protocol type, responsive to verifying that the application is associated with the request type; and
   computer usable program code configured to, responsive to verifying, update the attribute stream by applying a filter among one selected from the group consisting of an email attribute stream filter, file transfer protocol attribute stream filter and a hypertext transfer protocol attribute stream filter, based on the determination of the request type.

7. The computer program product of claim 6, wherein computer usable program code configured to update the attribute stream comprises computer usable program code configured to update the attribute stream to conform to extensible markup language format.

8. The computer program product of claim 6, wherein computer usable program code configured to update the attribute stream further comprises:
   computer usable program code configured to calculate an at least one checksum associated with the at least one storage object; and
   computer usable program code configured to update the attribute stream with the at least one checksum, the attribute stream associated with the at least one storage object.

9. The computer program product of claim 6, wherein computer usable program code configured to update the attribute stream further comprises:
   computer usable program code configured to obtain provenance data; and
   computer usable program code configured to update the attribute stream with the provenance data.

10. The computer program product of claim 9, wherein the attribute stream is updated to conform to extensible markup language format.

11. A data processing system for generating attribute streams, the data processing system comprising:
    a means for receiving a request from an application to write data to at least one storage object, the request having a request type, wherein the at least one storage object is a data structure on storage media that describes an aspect of a file system;

a means for updating an attribute stream with metadata associated with the at least one storage object, wherein the attribute stream is a sequence of metadata or data about data;

a means for updating an attribute stream with an at least one checksum, the attribute stream associated with the at least one storage object;

a storage server verifying that the application is associated with the request type;

responsive to verifying that the application is associated with the request type, a means for determining the request type to be among one selected from the group consisting of an email type, a file transfer protocol type, and a hypertext transfer protocol type; and a means for updating the attribute stream by applying a filter among one selected from the group consisting of an email attribute stream filter, file transfer protocol attribute stream filter and a hypertext transfer protocol attribute stream filter, based on the determination of the request type, responsive to verifying, by the storage server, the application.

* * * * *